US008965137B2

(12) United States Patent
Thomas et al.

(10) Patent No.: US 8,965,137 B2
(45) Date of Patent: Feb. 24, 2015

(54) IMAGE DATA TRANSMISSION

(71) Applicant: Calgary Scientific Inc., Calgary (CA)

(72) Inventors: Monroe Milas Thomas, Calgary (CA); Torin Arni Taerum, Calgary (CA); Michael Beauregard, Calgary (CA); Derek Scherger, Calgary (CA)

(73) Assignee: Calgary Scientific Inc. (CA)

( * ) Notice: Subject to any disclaimer, the term of this patent is extended or adjusted under 35 U.S.C. 154(b) by 0 days.

(21) Appl. No.: 13/723,289

(22) Filed: Dec. 21, 2012

(65) Prior Publication Data
US 2013/0182964 A1 Jul. 18, 2013

Related U.S. Application Data

(63) Continuation of application No. 12/658,010, filed on Feb. 1, 2010, now Pat. No. 8,345,994.

(60) Provisional application No. 61/202,146, filed on Feb. 2, 2009.

(51) Int. Cl.
*G06K 9/00* (2006.01)
*G06T 9/00* (2006.01)
*H04N 19/30* (2014.01)
*H04N 19/507* (2014.01)
*H04N 19/46* (2014.01)

(52) U.S. Cl.
CPC ............ *G06T 9/00* (2013.01); *H04N 19/00424* (2013.01); *H04N 19/00581* (2013.01); *H04N 19/00545* (2013.01)
USPC .......................................................... 382/232

(58) Field of Classification Search
USPC .......................................................... 382/232
See application file for complete search history.

(56) References Cited

U.S. PATENT DOCUMENTS 7,333,236 B2 * 2/2008 Herrmann ...................... 358/1.9
7,370,120 B2 * 5/2008 Kirsch et al. .................. 709/246

OTHER PUBLICATIONS

Wiersma, EP 1 744 287, published on Jan. 17, 2007, 17 Pages.*

* cited by examiner

*Primary Examiner* — Wesley Tucker
(74) *Attorney, Agent, or Firm* — Meunier Carlin & Curfman, LLC

(57) ABSTRACT

A method for transmitting image data sets via a communication network is provided. Image data are processed for dividing the image into a plurality of the image sub regions and for determining for each of the plurality of the image sub regions a hash code in dependence upon pixel data of pixels located in the respective image sub region. The hash codes are transmitted together with location data of the respective image sub regions if the hash code exists in an associative dataset and the pixel data are transmitted together with location data of the respective image sub regions if the hash code does not exist in the associative dataset. Upon receipt of at least one of the hash codes and the pixel data together with the location data, image data are generated.

16 Claims, 4 Drawing Sheets

IMAGE DATA TRANSMISSION

CROSS-REFERENCE TO RELATED APPLICATION

This application is a continuation of U.S. patent application Ser. No. 12/658,010, filed Feb. 1, 2010, entitled "IMAGE DATA TRANSMISSION." This application also claims the benefit of U.S. Provisional Patent Application No. 61/202,146 filed Feb. 2, 2009. The contents of the above-referenced applications are incorporated herein by reference.

FIELD OF THE INVENTION

The instant invention relates to the transmission of image data via a communication network and in particular to a method and system for reducing bandwidth used to transmit the image data.

BACKGROUND

Modern hospitals utilize medical images from a variety of imaging devices such as, for example, a Computer Tomography (CT) scanner or a Magnetic Resonance Imaging (MRI) scanner. The image data are then stored and transmitted using a computer network—typically comprising client-server architecture—to enable medical professionals to view and diagnose the captured medical images at a convenient workstation placed, for example, in a medical professional's office.

Present day imaging devices provide images with ever increasing resolution and facilitating or even enabling medical professionals' diagnostic capability. This improvement in resolution results in a substantial increase of the size of the image data, in particular for diagnostic quality medical images. The increase in set size is accompanied by substantially increased processing speed of computers and workstations for processing and displaying of the image data.

Unfortunately, this development is not accompanied by a similar increase in transmission speed for transmitting the image data, for example, from a server computer performing an image rendering process and a client computer displaying the image data and providing user interaction. For example, for large image data sets of diagnostic quality medical images transfer time for transmitting the image data between a sever computer and a client computer is too long to be useful for many user interactive applications.

It would be desirable to overcome the drawbacks associated with the transmission of large image data sets.

SUMMARY OF EMBODIMENTS OF THE INVENTION

In accordance with embodiments of the present invention there is provided a method for transmitting image data sets. An associative dataset comprising data associating a hash code with respective pixel data of at least an image sub region of a first image is provided. The at least an image sub region has a predetermined size. Using a first processor image data of a second image indicative of an object are processed for dividing the second image into at least an image sub region having the predetermined size and for determining location data indicative of a location of the at least an image sub region within the second image. Using the first processor for the at least an image sub region of the second image a hash code is determined in dependence upon pixel data of pixels located in the at least an image sub region of the second image. Using the first processor for the at least an image sub region of the second image are the transmitted one of: the hash code together with the location data if the hash code exists in the associative dataset; and, the pixel data together with the location data if the hash code does not exist in the associative dataset.

In accordance with embodiments of the present invention there is further provided a method for transmitting image data sets. Using a second processor in communication with the first processor the one of the hash code together with the location data and the pixel data together with the location data is received. Using the second processor image data of the second image are generated by performing one of: retrieving the pixel data from the associative dataset in dependence upon the received hash code and placing the retrieved pixel data in the second image in dependence upon the location data; and, placing the received pixel data in the second image in dependence upon the location data.

In accordance with embodiments of the present invention there is further provided a storage medium having stored therein executable commands for execution on a processor of a computer system, the processor when executing the commands provides an associative dataset comprising data associating a hash code with respective pixel data of at least an image sub region of a first image. The at least an image sub region has a predetermined size. The processor processes image data of a second image indicative of an object for dividing the second image into at least an image sub region having the predetermined size and determining location data indicative of a location of the at least an image sub region within the second image. The processor determines for the at least an image sub region of the second image a hash code in dependence upon pixel data of pixels located in the at least an image sub region of the second image. The processor transmits for the at least an image sub region of the second image one of: the hash code together with the location data if the hash code exists in the associative dataset; and, the pixel data together with the location data if the hash code does not exist in the associative dataset.

In accordance with embodiments of the present invention there is further provided storage medium having stored therein executable commands for execution on a processor of a computer system, the processor when executing the commands receives an associative dataset comprising data associating a hash code with respective pixel data of at least an image sub region of a first image. The at least an image sub region has a predetermined size. The processor receives one of a hash code together with location data and pixel data together with the location data. The processor generates image data of a second image by performing one of: retrieving the pixel data from the associative dataset in dependence upon the received hash code and placing the retrieved pixel data in the second image in dependence upon the location data; and, placing the received pixel data in the second image in dependence upon the location data.

BRIEF DESCRIPTION OF THE FIGURES

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Unless defined otherwise, all technical and scientific terms used herein have the same meaning as commonly understood by one of ordinary skill in the art to which the invention belongs.

While embodiments of the invention will be described for medical image data transmission between a server computer and a client computer for the sake of simplicity, it will become evident to those skilled in the art that the embodiments of the invention are not limited thereto, but are applicable in numerous other fields where large data sets are transmitted via data communication networks. Furthermore, while the embodiments of the invention will be described for the transmission of 2D image datasets for the sake of simplicity, they are not limited thereto but are also applicable for the transmission of 3D datasets and higher dimensional datasets.

Figure 1:
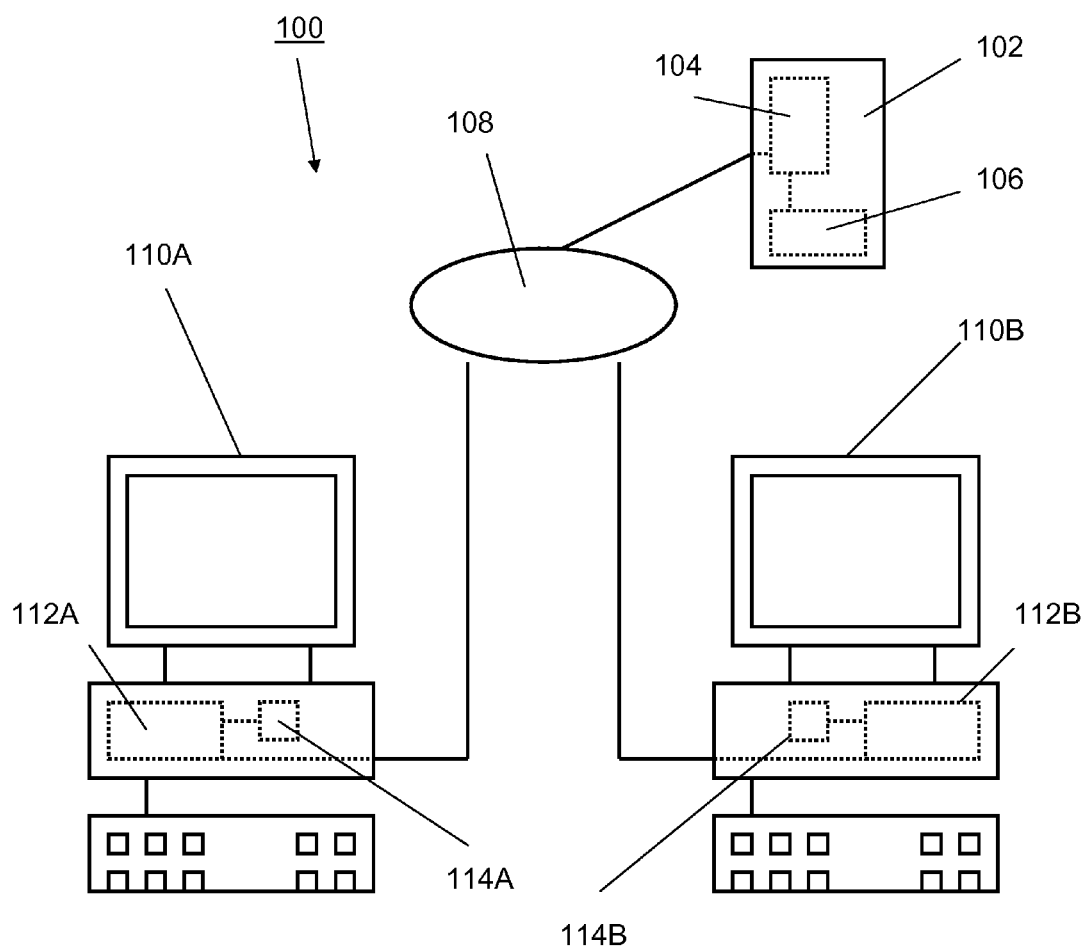
FIG. 1 is a simplified block diagram of a system for implementing the method for transmitting image data sets according to an embodiment of the invention; and, FIGS. 2 and 3 are simplified flow diagrams of embodiments of a method for accessing transmitting image data sets according to the invention.

Referring to FIG. 1, an example 100 of a system for implementing a method for transmitting image data sets according to an embodiment of the invention described herein below is shown. The system comprises a plurality of client computers 110A, 110B such as, for example, workstations for; viewing medical images of a patient and entering a diagnostic report into a respective patient application file. The client computers 110A, 110B are connected via a communication network 108 to a server computer 102. The server computer 102 is, for example, a central computer connected to a database via the communication network 108. The communication network 108 comprises, for example, a Local Area Network (LAN) connecting the client computers with one or more server computers within an organization such as, for example, a hospital. Alternatively, the communication network 108 comprises a Wide Area Network (WAN) or the Internet connecting client computers of various organizations such as, for example, hospitals, diagnostic clinics, and family physicians offices.

The embodiments of the method for transmitting image data sets according to the invention are performed, for example, by executing executable commands stored in a storage medium—for example, the memories 106, 114A, 114B—using processors 104, 112A, 112B of the server computer 100 and the client computers 110A, 110B in dependence upon the transmission of the image data.

Figure 2:
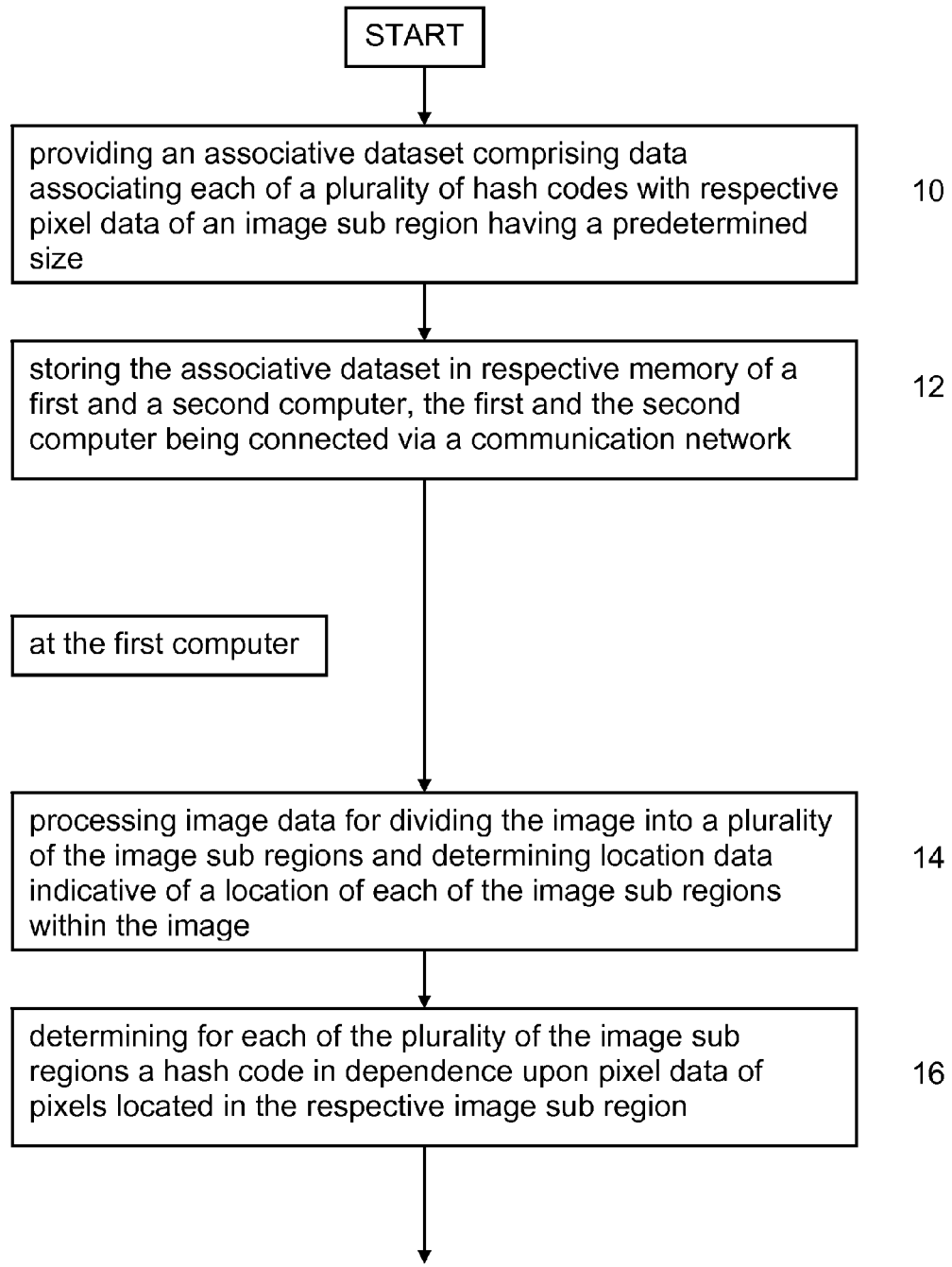
Figure 2:
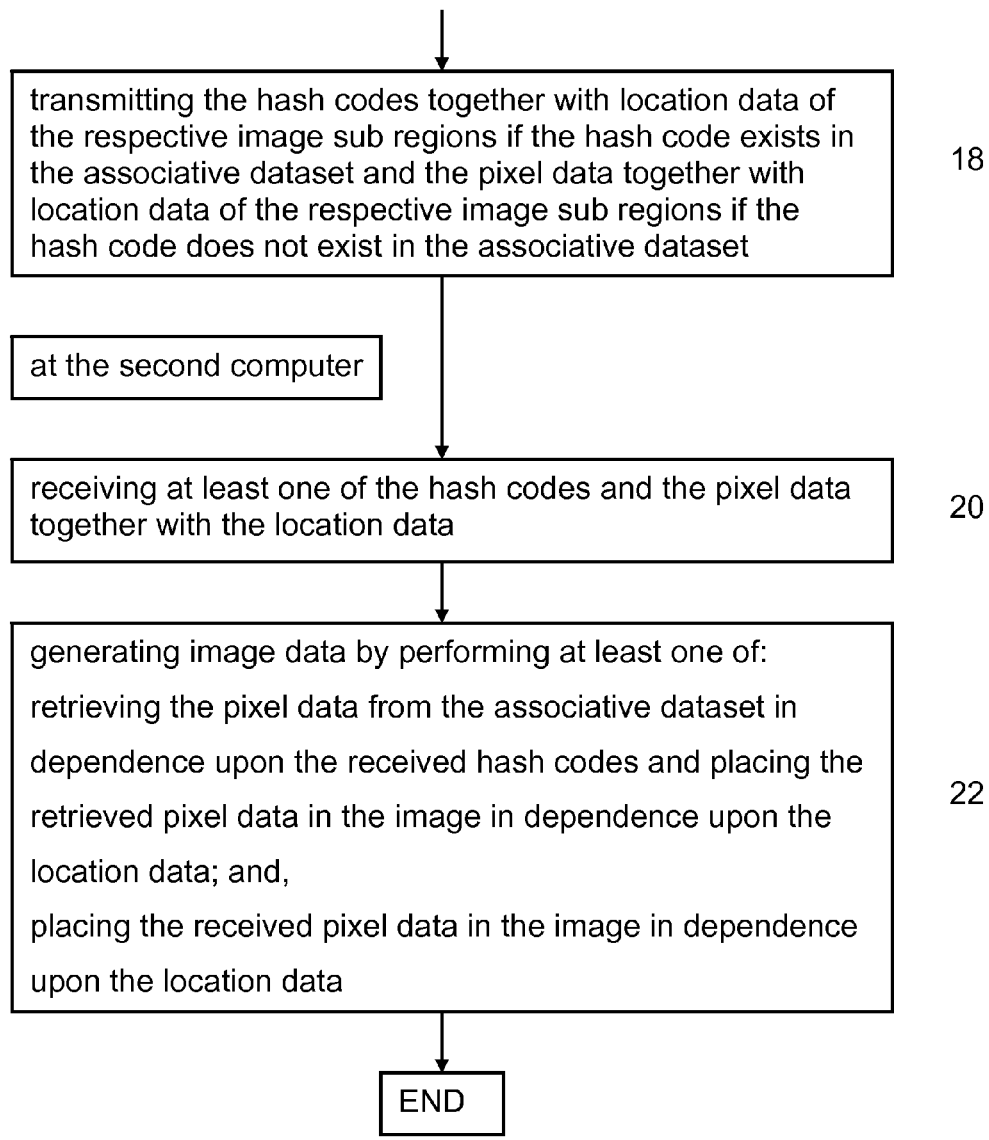
Figure 3:
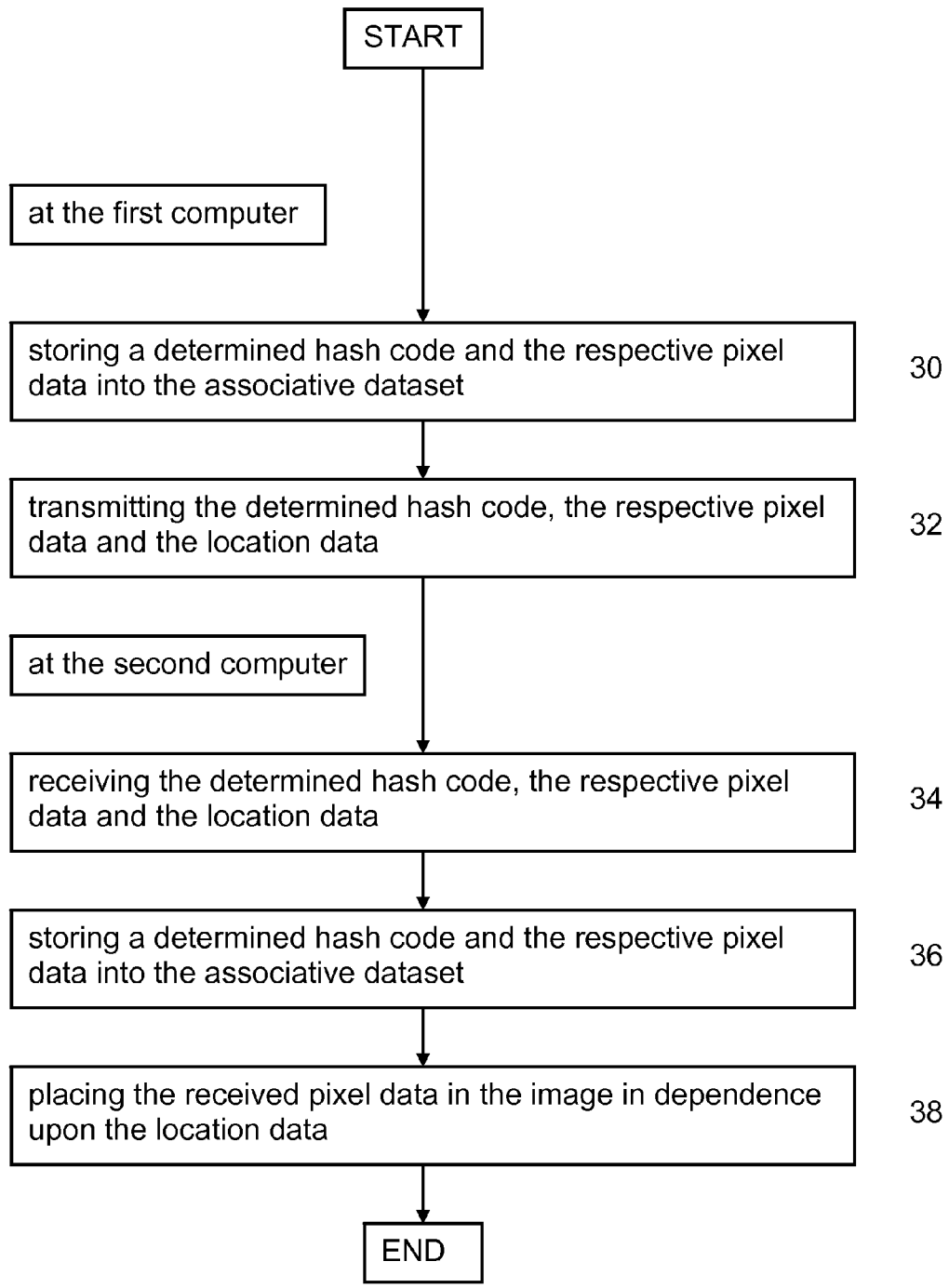

Referring to FIGS. 2 and 3, a method for transmitting image data sets according to embodiments of the invention is provided. At 10, an associative dataset comprising data associating each of a plurality of hash codes with respective pixel data of an image sub region having a predetermined size is provided. The associative dataset is then stored—12—in respective memory of a first and a second computer, for example, the server computer 102 and the client computer 110A which are connected via the communication network 108. The steps 10 and 12 are, for example, performed at the beginning of the transmission of a series of similar images, which occurs frequently during image rendering processes and/or viewing, for example, by a medical practitioner for performing a diagnosis. The associative dataset is of a same size on both computers and a same policy for discarding an existing entry when adding a new entry exceeds the size is applied. For example, the associative dataset is initially empty in the memories of both the first and the second computer and then filled with a predetermined number of entries generated by the first computer which are then transmitted to the second computer.

When an image is to be transmitted the following steps are performed. At the first computer the image data are processed—14—for dividing the image into a plurality of non-overlapping image sub regions and determining location data indicative of a location of each of the image sub regions within the image. The predetermined size of the image sub regions is a pixel dimension w×h which is the same for the first and the second computer. Optionally, the image is divided into sub regions of size less than the predetermined size. At 16, for each of the plurality of the image sub regions a hash code is determined in dependence upon pixel data of pixels located in the respective image sub region.

The hash code is determined as a function of the pixel data in a w×h image sub region of the image. If the dimension of the image sub region is less than w×h, then the sub region is assumed to cover the upper left portion of the area w×h, and the remaining portions are assumed to be a constant value, for example, black. To be useful, the size of the tile hash code is determined to be smaller than the size of the pixel data in a sub region, and thus likely not all choices of w×h are useful. Preferably, a hash function is chosen that will produce a substantially uniform distribution of the hash codes over the set of all possible values of pixel data in an image sub region. For example, the hash functions SHA-1 and Murmur2 have been used for implementing the embodiments of the method for transmitting image data sets, but the implementation is not limited thereto.

The hash codes are then transmitted—18—together with location data of the respective image sub regions if the hash code exists in the associative dataset, and the pixel data are transmitted together with location data of the respective image sub regions if the hash code does not exist in the associative dataset.

At the second computer at least one of the hash codes and the pixel data are received—20—together with the location data. Using a processor of the second computer image data are generated—22—by performing at least one of: retrieving the pixel data from the associative dataset in dependence upon the received hash codes and placing the retrieved pixel data in the image in dependence upon the location data; and, placing the received pixel data in the image in dependence upon the location data. For example, the associative dataset is in the form of a look up table allowing looking up the corresponding pixel data using the hash code.

Optionally, a new entry is generated when the determined hash code does not exist in the associative dataset, as illustrated in FIG. 3. At the first computer a determined hash code and the respective pixel data are stored—30—into the associative dataset. Then the determined hash code, the respective pixel data and the location data are transmitted—32. At the second computer the determined hash code, the respective pixel data and the location data are received—34—and the determined hash code and the respective pixel data are then stored—36—into the associative dataset. At 38, the received pixel data are placed in the image in dependence upon the location data.

For example, the entries in the associative dataset are dynamically updated on both the first and the second computer. Both computers agree on a same maximum number of entries, but the associative datasets on both sides are initially empty. Alternatively, the associative datasets ate both computers contain entries that are likely to be hit and the first computer does not transmit the initial entries since they are known at the second computer. The associative dataset is then dynamically updated over a period of a conversation between the first and the second computer. When the first computer sends the hash code, pixel data, and location data, it is a signal for the second computer to add a new entry to the associative dataset. When the first computer sends hash code and location data, the second computer looks up corresponding pixel data in the associative dataset. When the first computer sends pixel data and location data, the second computer doesn't reference the associative dataset but places the pixel data into the appropriate location of the host image.

In an embodiment of the method for transmitting image data sets according to the invention the image is divided into color component images—for example, Red, Green, and Blue (RGB)—which are in turn divided into non-overlapping sub regions of size less equal w×h. Each color component image is then processed as disclosed above with respect to FIGS. 2 and 3 resulting in three color component images which are then superposed to produce the final image. Alternatively, other color component decompositions are employed such as, for example, YUV, CMYK, or HSL.

The present invention has been described herein with regard to preferred embodiments. However, it will be obvious to persons skilled in the art that a number of variations and modifications can be made without departing from the scope of the invention as described herein.

What is claimed is:

1. A method comprising:
    storing a dataset at a first computer and a second computer, the dataset comprising hash codes that are each associated with pixel data of a respective subregion of images in the dataset;
    processing image data by generating a hash code from pixel data in a subregion of an image defined by the image data and determining location data of the subregion of the image;
    determining if the generated hash code is in the dataset at the first computer;
    if the hash code is not in the data set at the first computer, then transmitting the hash code, the location data and the pixel data to the second computer and adding the hash code and the pixel data of the subregion to the dataset at the first computer; and
    if the hash code is in the data set at the first computer then transmitting the hash code and the location data to the second computer.

2. The method of claim 1, wherein each subregion is a are non-overlapping region of the image.

3. The method of claim 1, wherein each subregion is defined as a rectangular region having a same dimension at the first computer and the second computer.

4. The method of claim 1, wherein the image data comprises a series of related images.

5. The method of claim 4, wherein image data comprises medical images.

6. The method of claim 1, wherein the dataset is of a same size of the first computer and at the second computer.

7. The method of claim 1, further comprising:
    storing the dataset in a lookup table; and
    discarding entries in the lookup table when the dataset exceeds a predetermined size.

8. The method of claim 7, further comprising:
    initializing the dataset as an empty set; and
    filling the dataset with entries generated at the first computer that are transmitted to the second computer.

9. The method of 7, further comprising:
    initializing the dataset as an empty set; and
    pre-populating entries at the second computer with entries that are likely to be encountered at the first computer.

10. The method of claim 1, wherein the location data is indicative of a location subregion within the image.

11. The method of claim 1, wherein a size of the hash code is smaller than a size of the pixel data its respective subregion.

12. The method of claim 1, wherein the hash function comprises a SHA-1 or a Murmur2 hash function.

13. The method of claim 1, further comprising adding the hash code and the pixel data of the subregion to the dataset at the second computer.

14. The method of claim 1, further comprising dynamically updating entries in the dataset at each of the first computer and the second computer.

15. The method of claim 1, further comprising providing the dataset into plural data sets in accordance with color component images.

16. The method of claim 1, wherein each hash code is generated from a hash function that produces hash codes having a substantially uniform distribution of hash codes over a set of all possible values of pixel data.

* * * * *